US011551376B2

(12) United States Patent
Zachrisson et al.

(10) Patent No.: US 11,551,376 B2
(45) Date of Patent: Jan. 10, 2023

(54) DETERMINATION OF POSITION OF A HEAD-MOUNTED DEVICE ON A USER

(71) Applicant: Tobii AB, Danderyd (SE)

(72) Inventors: Joakim Zachrisson, Danderyd (SE); Mikael Rosell, Danderyd (SE); Carlos Pedreira, Danderyd (SE); Mark Ryan, Danderyd (SE); Simon Johansson, Danderyd (SE)

(73) Assignee: TOBII AB, Danderyd (SE)

( * ) Notice: Subject to any disclaimer, the term of this patent is extended or adjusted under 35 U.S.C. 154(b) by 279 days.

(21) Appl. No.: 16/663,672

(22) Filed: Oct. 25, 2019

(65) Prior Publication Data

US 2020/0134867 A1    Apr. 30, 2020

(51) Int. Cl.
*G06K 9/00* (2022.01)
*G06T 7/73* (2017.01)
*G02B 27/00* (2006.01)

(52) U.S. Cl.
CPC ............ *G06T 7/74* (2017.01); *G02B 27/0068* (2013.01); *G06T 2207/30201* (2013.01)

(58) Field of Classification Search
CPC ............ G06T 7/74; G06T 2207/30201; G02B 27/017; G02B 27/0068; G02B 27/0093; G02B 27/0172; G02B 2027/014; G06V 40/18; G06F 3/013
See application file for complete search history.

(56) References Cited

U.S. PATENT DOCUMENTS

| 9,835,864 | B2 | 12/2017 | Morifuji et al. |
| 2014/0375540 | A1 | 12/2014 | Ackerman et al. |
| 2015/0312558 | A1 | 10/2015 | Miller et al. |
| 2017/0090203 | A1 | 3/2017 | Mullins et al. |
| 2019/0258442 | A1* | 8/2019 | Hudman ............ G02B 27/0176 |
| 2020/0019241 | A1* | 1/2020 | Ninomiya ............ A61B 3/113 |
| 2020/0292848 | A1* | 9/2020 | Yadin ..................... G02C 7/083 |

OTHER PUBLICATIONS

"Swedish Search Report issued by the Swedish Patent and Registration Office for Patent Application No. 1851340-8 dated May 6, 2019".

* cited by examiner

*Primary Examiner* — Sean M Conner
(74) *Attorney, Agent, or Firm* — Kilpatrick Townsend & Stockton LLP

(57) ABSTRACT

There is provided a method and system for determining if a head-mounted device for extended reality (XR) is correctly positioned on a user, and optionally performing a position correction procedure if the head-mounted device is determined to be incorrectly positioned on the user. Embodiments include: performing eye tracking by estimating, based on a first image of a first eye of the user, a position of a pupil in two dimensions; determining whether the estimated position of the pupil of the first eye is within a predetermined allowable area in the first image; and, if the determined position of the pupil of the first eye is inside the predetermined allowable area, concluding that the head-mounted device is correctly positioned on the user; or, if the determined position of the pupil of the first eye is outside the predetermined allowable area, concluding that the head-mounted device is incorrectly positioned on the user.

18 Claims, 7 Drawing Sheets

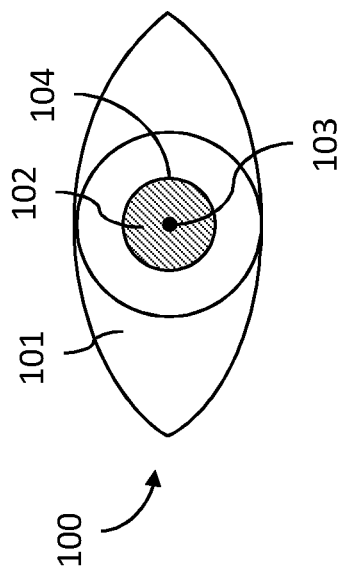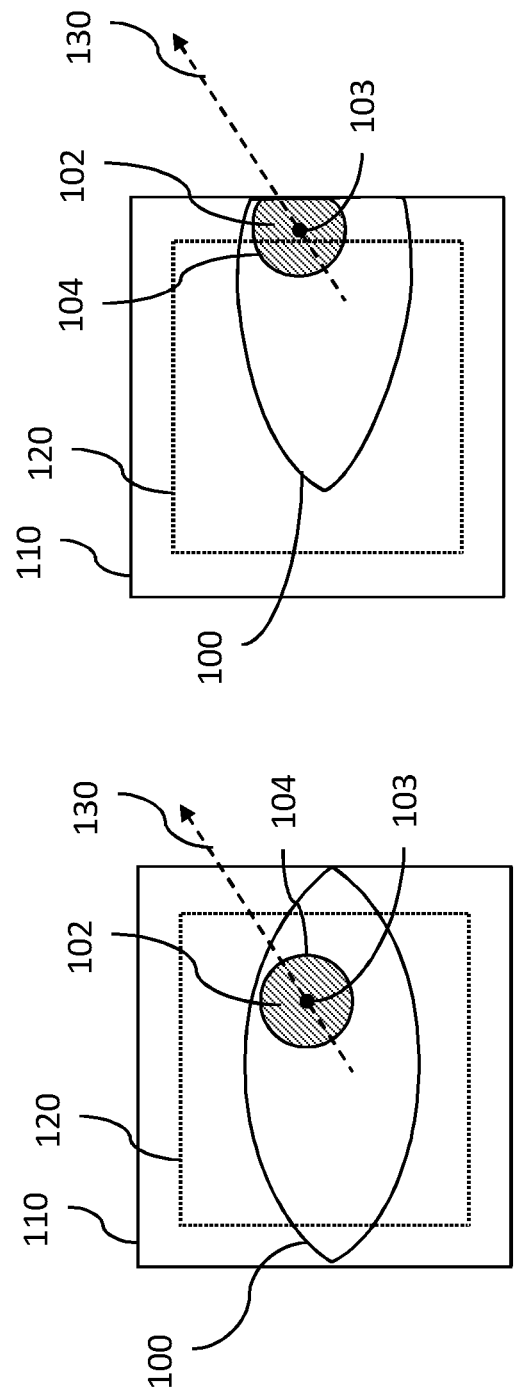
FIG. 1a
FIG. 1b
FIG. 1c

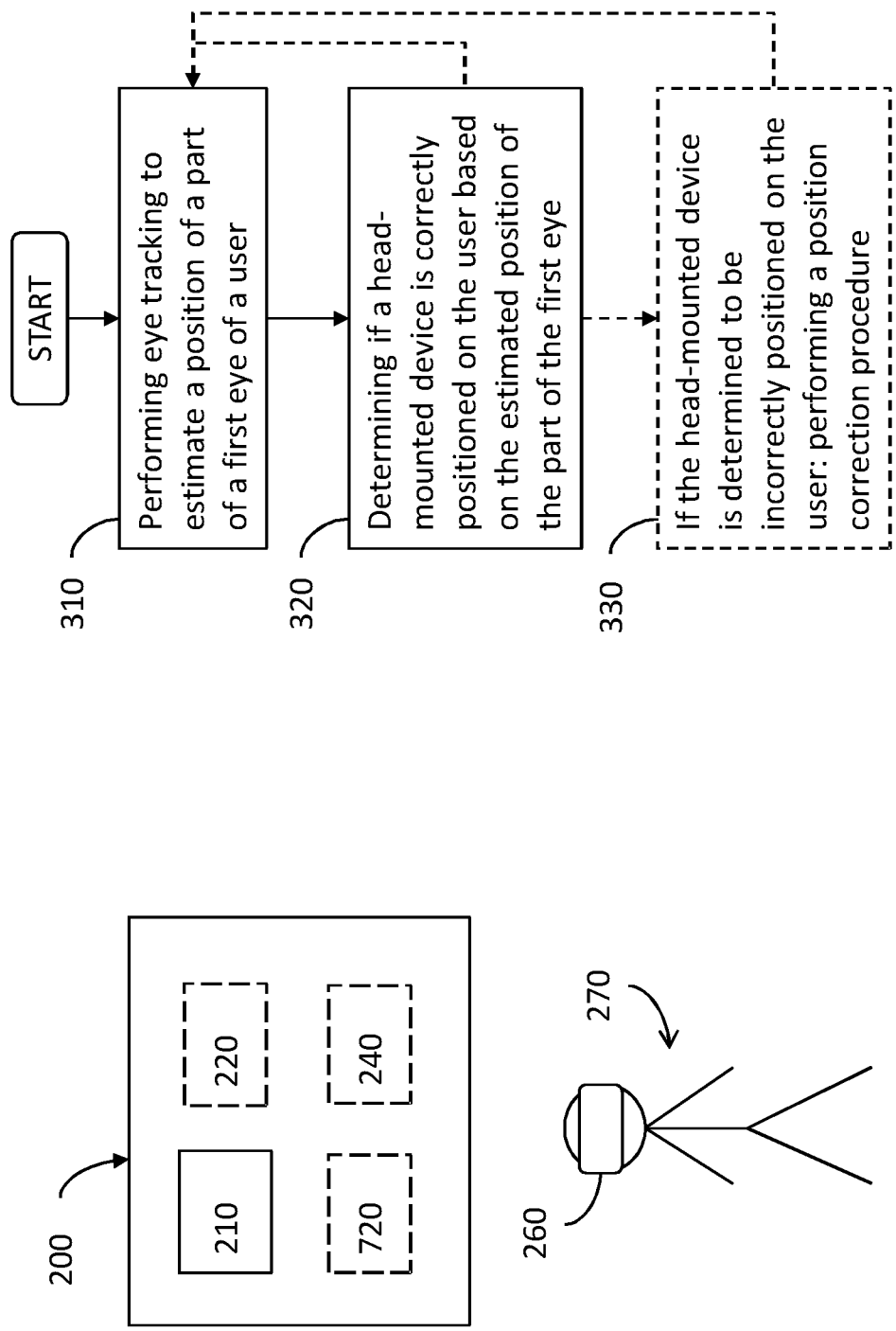

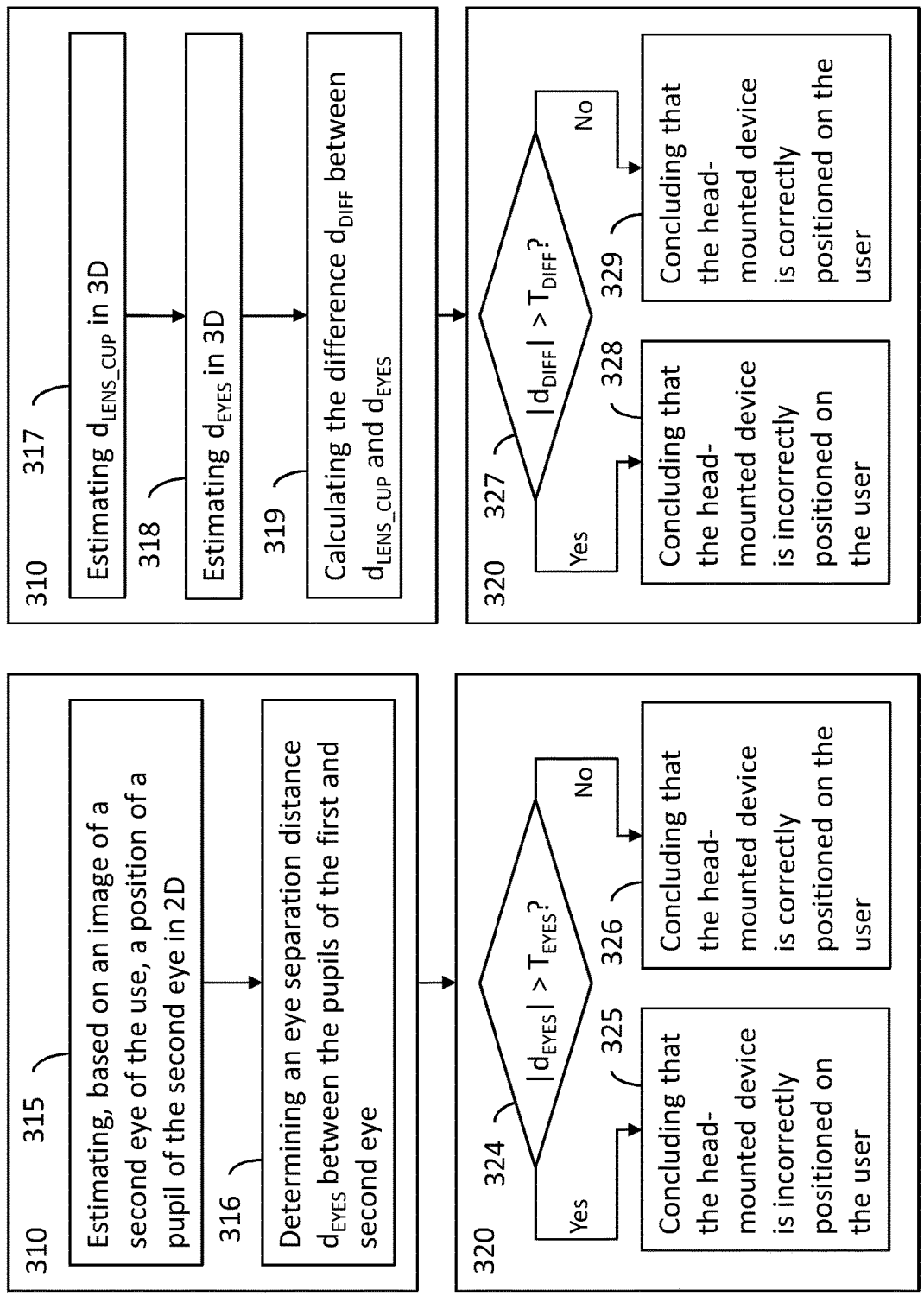

DETERMINATION OF POSITION OF A HEAD-MOUNTED DEVICE ON A USER

CROSS-REFERENCES TO RELATED APPLICATIONS

This application claims priority to Swedish Application No. 1851340-8, filed Oct. 29, 2018; the content of which are hereby incorporated by reference.

TECHNICAL FIELD

The present disclosure generally relates to determining the position of a head-mounted device for virtual reality (VR), augmented reality (AR), mixed reality (MR) or other extended reality (XR) on a user. The present disclosure also relates to corresponding systems and storage media.

BACKGROUND

The performance of head-mounted devices such as virtual-reality (VR) headsets, augmented reality (AR) headsets, mixed reality (MR) headsets or other version of extended reality (XR) headset may be negatively affected if the head-mounted device is not properly mounted at the user's head. Also, even if a head-mounted device has initially been positioned correctly, the head-mounted device may be repositioned during use, for example due to slippage when the head of the user moves or rotates.

Since lenses or other optical equipment of the head-mounted device are typically optimized for a certain position relative to the user's eyes, a user wearing the head-mounted device incorrectly may experience problems that lead to an inferior visual experience. For example, if the head-mounted device is adapted to provide a three-dimensional (3D) experience to the user, this 3D experience may become distorted if the head-mounted device is incorrectly positioned on the user's head. A VR or MR experience provided by the head-mounted device may for example become less realistic, or virtual objects shown by an AR or MR headset may not fit into the real environment as well as they could have done. Any images shown to the user on a screen of the head-mounted device may further be experienced as blurry.

If the head-mounted device is equipped with eye tracking or gaze tracking functionality, the performance of such functionality may also be negatively affected if the head-mounted device is incorrectly positioned on the user's head, since the eye tracker or gaze tracker will not be able to see/detect the user's eyes, and hence the quality of any tracking signals will be poor.

There is a need to provide solutions to one or more of the identified problems.

SUMMARY

Methods, systems and computer-readable storage media having the features defined in the independent claims are provided for solving or at least ameliorating one or more of the identified problems. Preferable embodiments are defined in the dependent claims.

Specifically, embodiments presented herein aim at achieving an optimized visual experience for the user, and to enable the best possible prerequisites for the performance of eye tracking or gaze tracking.

These aims are achieved by providing solutions for identifying if a head-mounted device is positioned correctly at the head of a user. According to some embodiments, the solutions provided herein go even farther by, if head-mounted device is incorrectly positioned, doing something about it, by for example letting the user and/or system know about the problem; guiding the user on how to reposition the head-mounted device; and/or provide automatic repositioning.

In a first aspect, there are provided embodiments of a method for determining if a head-mounted device for extended reality (XR) is correctly positioned on a user, the method comprising performing eye tracking, using processing circuitry, by: estimating, based on a first image of a first eye of the user, the position of a pupil of the first eye. The method further comprises determining, using the processing circuitry, if the head-mounted device is correctly positioned on the user, by determining whether the estimated position of the pupil of the first eye is within a predetermined allowable area in the first image. If the determined position of the pupil of the first eye is inside the predetermined allowable area of the first image the method comprises concluding that the head-mounted device is correctly positioned on the user. Alternatively, if the determined position of the pupil of the first eye is outside the predetermined allowable area of the first image the method comprises concluding that the head-mounted device is incorrectly positioned on the user.

According to a second aspect, there are provided embodiments of a system for determining if a head-mounted device for extended reality (XR) is incorrectly positioned on a user, the system comprising processing circuitry configured to perform eye tracking, by estimating, based on a first image of a first eye of the user, the position of a pupil of the first eye. The processing circuitry is further configured to determine if the head-mounted device is correctly positioned on the user, by determining whether the estimated position of the pupil of the first eye is within a predetermined allowable area in the first image. If the determined position of the pupil of the first eye is inside the predetermined allowable area of the first image, the processing circuitry is configured to conclude that the head-mounted device is correctly positioned on the user. If the determined position of the pupil of the first eye is outside the predetermined allowable area of the first image the processing circuitry is configured to conclude that the head-mounted device is incorrectly positioned on the user.

In a third aspect, there is provided a non-transitory computer-readable storage medium storing instructions which, when executed by processing circuitry of a system, cause the system to: perform eye tracking, by: estimating, based on an image of a first eye of the user, the position of the pupil of the first eye; and determine if the head-mounted device is correctly positioned on the user, by: determining whether the estimated position of the pupil of the first eye is within a predetermined allowable area in the first image; and if the determined position of the pupil of the first eye is inside the predetermined allowable area of the first image: concluding that the head-mounted device is correctly positioned on the user, or if the determined position of the pupil of the first eye is outside the predetermined allowable area of the first image: concluding that the head-mounted device is incorrectly positioned on the user.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In the following, example embodiments will be described in greater detail with reference to the accompanying drawings, in which:

FIG. 1a is a front view of an eye;

FIG. 1b shows an image of the eye of FIG. 1a;

FIG. 1c shows an image of the eye of FIG. 1a;

FIG. 2 is a schematic overview of a system, according to one or more embodiments;

FIG. 3a is a flow chart of a method for determining if a head-mounted device for extended reality (XR) is correctly positioned on a user, according to one or more embodiments;

FIGS. 3b to 3e are flow charts showing embodiments of the method of FIG. 3a;

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Embodiments of the present disclosure aim at determining if a user is wearing a head-mounted device correctly. Some embodiments herein further include, upon determination that the head-mounted device is incorrectly positioned on the user, performing a position correction procedure. The position correction procedure may comprise informing the user, or the system, or both, about the determined incorrect positioning of the head-mounted device, and/or in applicable cases performing automatic position correction.

By a correct position of head-mounted device on a user, we mean that the head-mounted device is positioned on the head of the user such that the optics of the head-mounted device that are arranged to enable the user to experience VR, AR, MR or other XR content, as well as see any images of the surroundings and/or see the real world surroundings, is optimally positioned in relation to the user's field of view. Of course, optimally positioned is to be understood as being in the optimal position, or in a position that is not the optimal position, but within an allowable tolerance of the optimal position. This leads to the user's gaze being directed at the center, or allowably close to the center, of an image presented by the head-mounted device.

To obtain a correct position of the head-mounted device on a user, two different aspects are considered.

1. Is there to big a difference in distance between the user's eyes and the lens cups of the head-mounted device? In other words, does the lens cup distance need to be adjusted? and
2. is the field of view (FOV) of the user aligned with optics of the head-mounted device? In other words, are the If the answer to one or both of these questions, for one or both eyes of the user, is yes, then it can be concluded that the head-mounted device is incorrectly positioned on the user.

Figures 3B, 3C:
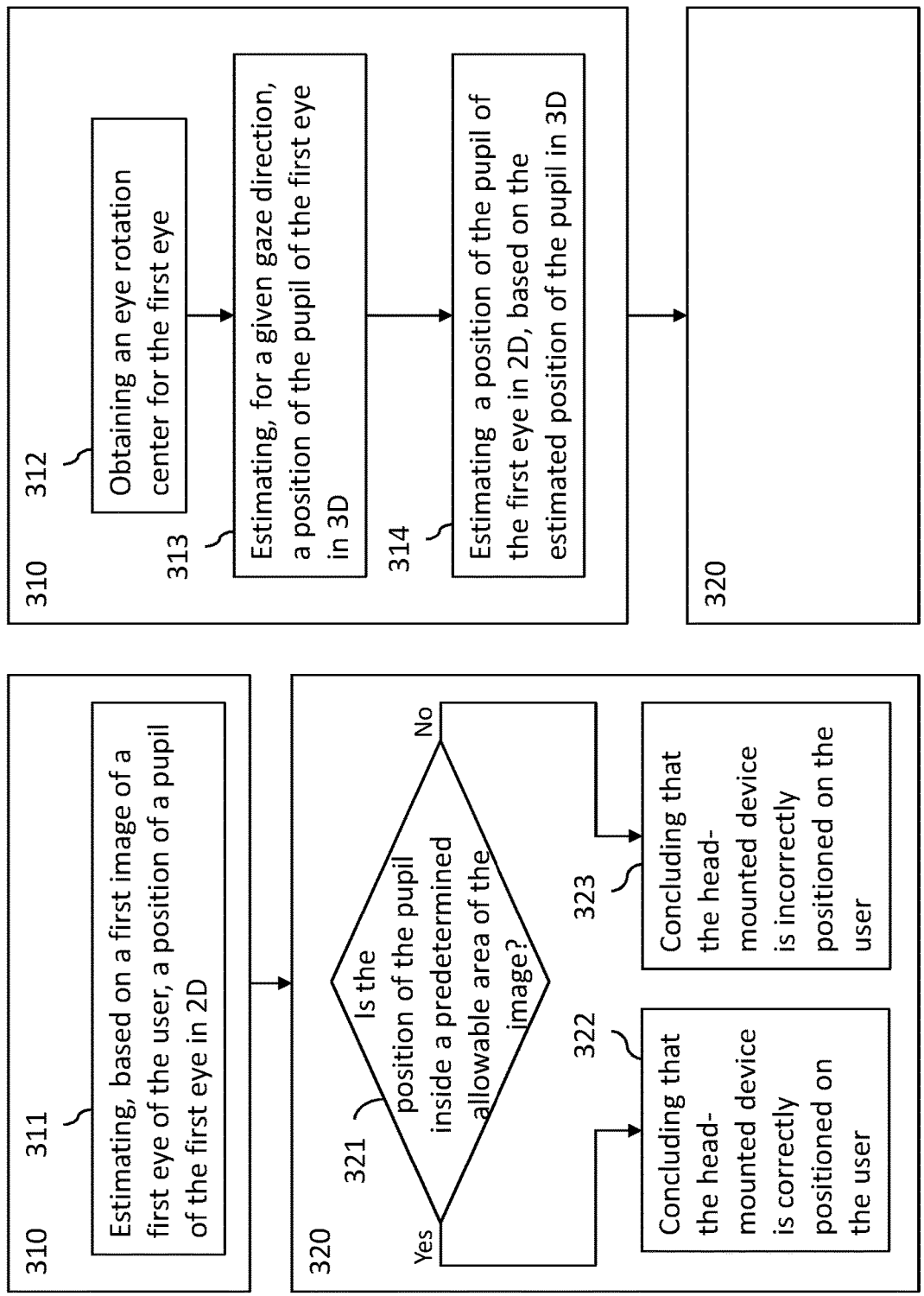

Embodiments described herein, in connection with the figures, present solutions on how to find reliable answers to one or both of the questions above. Specifically, embodiments of the method (and corresponding system and non-transitory computer readable medium) presented in connection with FIGS. 3d and 3e are directed at finding a reliable answer to question 1, while embodiments of the method (and corresponding system and non-transitory computer readable medium) presented in connection with FIGS. 3b and 3c are directed at finding a reliable answer to question 2. As explained herein, a combination of method embodiments is conceivable. The combination may mean a possibility to better answer one of the questions, or to answer both questions, thereby achieving an improved answer to the question of whether the head-mounted device is correctly positioned on the user or not.

By ensuring that the head-mounted device is correctly positioned on the user, we ensure that any image content displayed to the user will be of the highest possible quality. At the same time, any camera sensors of eye tracking functionality in the head-mounted device, or in a system according to embodiments presented herein, will also be able to obtain optimized images of the eyes of the user, since the user's gaze when the user looks "straight ahead" will, for each eye, be directed at or sufficiently close to the center of the image depicting the eye. In other words, the FOV of the user will be aligned with the optimal position, "sweet spot", of the optics of the head-mounted device.

Embodiments herein relate to a head-mounted device for virtual reality (VR), augmented reality (AR), mixed reality (MR) or other extended reality (XR) applications. In other words, in the context of the present disclosure, at least the techniques referred to as VR, AR and MR are included in the concept XR.

Throughout the present disclosure, the term head-mounted device refers to a device adapted to be worn at the head of a user. The head-mounted device may comprise display optics. The display optics is to be understood as comprising any optics suitable for generating and/or displaying 2D image data, 3D image data, graphical data, holographic data or other content that may be presented to a user/wearer of the head-mounted device to convey a VR, AR, MR or other XR experience. In addition to the actual display optics, the head-mounted device typically also includes other components. Such other components may for example include circuits for powering the head-mounted device, sensors for detecting motion of the head-mounted device, eye or gaze tracking equipment, or a casing for protecting components of the head-mounted device. In other words, the term head-mounted device may, but should not necessarily, be construed as only referring to the actual display optics intended to be arranged in front of an eye of the user, or in front of both eyes of the user.

The term eye tracking as used herein may be understood as comprising: tracking or observing actual parts of an eye, in the real world, in a 3D model of the eye, in a 2D image depicting the eye; or determining what the eye is tracking or gazing towards. Determination of what the eye is tracking or gazing towards may also be referred to as gaze tracking.

Any embodiment described herein as referring to one eye, for instance a first eye, of a user is of course equally applicable to the any of the user's eyes, and may also be performed for both the eyes of a user in parallel, or consecutively.

Throughout the present disclosure, the term obtaining information may be understood as receiving information, in a push fashion, and/or retrieving information, in a pull fashion.

Head-mounted device position determination methods, head-mounted device position determination systems, and associated storage media will be described below with reference to FIG. 1b-8. First, certain features of an eye will be described with reference to FIGS. 1a and 4.

Figure 4:
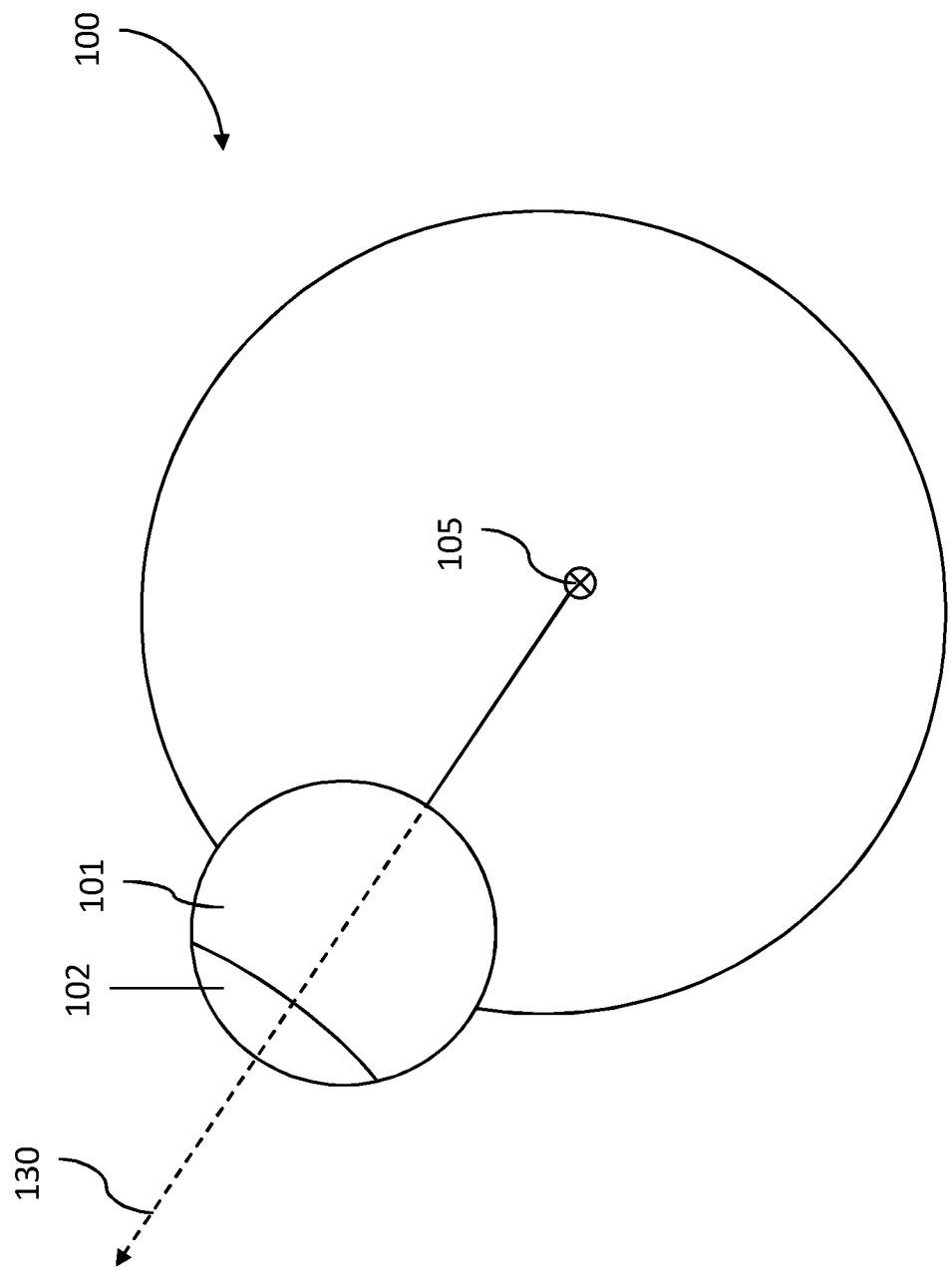
FIG. 4 is a cross sectional view of the eye from FIG. 1a from the side of the eye.

FIG. 1a is a front view of an eye 100. FIG. 4 is a cross sectional view of the eye 100 from the side of the eye 100. While FIG. 4 shows more or less the entire eye 100, the front view presented in FIG. 1a only shows those parts of the eye 100 which are typically visible from in front of a person's face. The eye 100 has a cornea 101 and a pupil 102, with a pupil center 103 and a pupil edge 104.

System Architecture

FIG. 2 is a schematic overview of a system 200, according to one or more embodiments, for determining if a head-mounted device 260 for extended reality (XR) is incorrectly positioned on a user 270. The system 200 comprises processing circuitry 210 configured to perform eye tracking to estimate a position of a part of a first eye 100 of the user 270, and configured to determine if the head-mounted device 260 is correctly positioned on the user 270, based on the estimated position of the part of the first eye 100. The system 200 may further comprise, or be communicatively connected to, a display 720.

The processing circuitry 210 may in some non-limiting embodiments comprise, or be communicatively connected to, eye tracking equipment 220, for example in the form of one or more illuminators for illuminating the eye 100 of the user 270 and one or more cameras for capturing images of the eye 100 while the eye 100 looks/gazes at the display 720, or any other suitable eye tracking equipment known in the art. The may be communicatively connected to the eye tracking equipment, for example via a wired or wireless connection. The illuminators may for example be infrared or near infrared illuminators, for example in the form of light emitting diodes (LEDs). However, other types of illuminators may also be envisaged. The cameras may for example be charged-coupled device (CCD) cameras or Complementary Metal Oxide Semiconductor (CMOS) cameras. However, other types of cameras may also be envisaged.

The display 720 may for example be a liquid-crystal display (LCD) or a LED display. However, other types of displays may also be envisaged. The display may for example be flat or curved. The display 720 may for example be placed in front of one of the user's eyes. Separate displays 720 may be employed for the left and right eyes. Separate eye tracking equipment 220 (such as illuminators and cameras) may for example be employed for the left and right eyes.

The processing circuitry 210 may be employed for eye tracking for both eyes, or there may be separate processing circuitry 210 for the left and right eyes. The system 200 may for example perform eye tracking to estimate a position of a part of an eye for the left and right eyes separately, and may then determine if the head-mounted device 260 is correctly positioned on the user 270, based on the estimated position of the part of both eyes. In a non-limiting example, the processing circuitry 210 may be configured to determine that the head-mounted device 260 is incorrectly positioned on the user 270 if it has been determined that the head-mounted device 260 is incorrectly positioned on the user 270 for at least one of the user's eyes.

The processing circuitry 210 may for example comprise one or more processors. The processor(s) may for example be application-specific integrated circuits (ASIC) configured to perform a specific eye tracking and position determination method. Alternatively, the processor(s) may be configured to execute instructions (for example in the form of a computer program) stored in one or more memories 240. Such a memory 240 may for example be comprised in the system 200, or may be external to (for example located remotely from) the system 200. The memory 240 may store instructions for causing the system 200 to perform a method according to any of the embodiments presented in connection with FIGS. 3a to 3e.

The processing circuitry 210 may in one or more embodiment be configured to perform any or all of the method embodiments described in connection with FIGS. 3a to 3e.

It will be appreciated that the system 200 described above with reference to FIG. 2 is provided as an example, and that many other systems may be envisaged. For example, the system 200 may consist only of the processing circuitry 210. The display 720 may for example be comprised in the system 200, or may be regarded as separate from the system 200.

Eye tracking performed by systems such as the system 200 in FIG. 2 typically employ an eye model. This eye model is calibrated to properties of the individual user's eyes.

A user 270 wearing a head-mounted device 260 is schematically illustrated next to the system 200 in FIG. 2. The system 200 according to any embodiment presented herein may be incorporated in, or communicatively connected to, such a head-mounted device 260.

Method Embodiments

In the following, method embodiments will be described in connection with FIGS. 3a to 7b.

FIG. 3a shows embodiments of a method for determining if the head-mounted device 260 for extended reality (XR) is correctly positioned on the user 270, the method comprising:

In step 310: performing eye tracking, using processing circuitry 210, to estimate a position of a part of a first eye 100 of the user 270.

In step 320: determining, using the processing circuitry 210, if the head-mounted device 260 is correctly positioned on the user 270, based on the estimated position of the part of the first eye 100.

In an optional step 330: if the head-mounted device 260 is determined to be incorrectly positioned on the user 270, performing a position correction procedure.

In the context of the present disclosure, performing the position correction procedure may comprise any or all of the following:

if the lens cup distance $d_{LENS\_CUP}$ has been determined to be too small or too large, performing motorized position correction of the lens cup distance $d_{LENS\_CUP}$;

notifying the system 200 or the user 270 about the determined incorrect position of the head-mounted device 260; or activating a positioning guide, which positioning guide provides guidance on steps to be taken for manual correction of the position of the head-mounted device 260.

Activating a positioning guide may include displaying, presenting or otherwise communicating repositioning information or steps to be taken to the user 270. The repositioning information or steps to be taken are configured to guide and thereby enabling the user 270 to improve the position of the head-mounted device 260.

Different embodiments of the method shown in FIG. 3a will now be presented in connection with FIG. 3b to FIG. 3e.

In some embodiments, step 310 of performing eye tracking, using processing circuitry 210, and/or 320 of determining if the head-mounted device 260 is correctly positioned on the user 270, using processing circuitry 210, may comprise the sub-steps shown in FIG. 3b, in connection with FIG. 1b and FIG. 1c. In these embodiments, the method comprises:

In step 311: estimating, based on a first image 110 of the first eye 100 of the user 270, the position of the pupil 102 of the first eye 100 in two dimensions.

The position of the pupil 102 may be defined as a two dimensional (2D), or three dimensional (3D), coordinate described according to any suitable coordinate system. For the purposes of step 310, the first image 110 is typically a 2D image, whereby the position of the pupil 102 is defined in 2D. For example, the position of the pupil 102 may be defined as a 2D coordinate according to a coordinate system defined in relation to the first image 110 and/or the camera used for capturing the first image 110, for example the coordinate system 530 illustrated in FIG. 5. Alternatively, the position of the pupil 102 may be defined as a group of two or more 2D coordinates comprised within the area of the pupil as depicted in the first image 110.

In some embodiments, the method may comprise obtaining the image 110, by receiving or retrieving the first image 110 from a memory or camera (not shown in the figures) incorporated in or external to the system 200.

In some embodiments, the position of the pupil 102 may in the context of step 310 be approximated as the position of the pupil center 103. In some embodiments, the position of the pupil 102 in the context of step 310 may be derived from one or more coordinates located on the pupil edge 104. In some embodiments, the position of the pupil 102 may in the context of step 310 be approximated as the position of the center of the iris (not shown in the figures).

In step 321: determining whether the estimated position of the pupil 102 of the first eye 100 is within a predetermined allowable area 120 in the first image 110.

The predetermined allowable area 120 is typically smaller in at least the x direction or y direction compared to the first image 110, as illustrated in FIGS. 1b and 1c.

If the determined position of the pupil 102 of the first eye 100 is inside the predetermined allowable area 120 of the first image 110, the method is continued in step 322.

If the determined position of the pupil 102 of the first eye 100 is outside the predetermined allowable area 120 of the first image 110, the method is continued in step 323.

If the determined position of the pupil 102 of the first eye 100 is defined as a single 2D coordinate, the position of the pupil 102 of the first eye 100 being outside the predetermined allowable area 120 of the first image 110 is to be understood as the coordinate being located outside area 120.

If the determined position of the pupil 102 of the first eye 100 is defined as a group of two or more 2D coordinates comprised within the area of the pupil 102 as depicted in the first image 110, the position of the pupil 102 of the first eye 100 being outside the predetermined allowable area 120 of the first image 110 is to be understood as a part, or all, of the group of coordinates being located outside area 120.

In step 322: concluding that the head-mounted device 260 is correctly positioned on the user 270.

In step 323: concluding that the head-mounted device 260 is incorrectly positioned on the user 270.

Optionally, the method of FIG. 3, according to one or more embodiments, is performed repeatedly, starting again from step 310 when step 320 is completed. This option is illustrated by the dashed arrow in FIG. 3. The method of FIG. 3 may also, according to one or more other embodiments, be performed only once, at certain preset time intervals, or according to other rules specified in the system setup.

In some embodiments, step 320 of determining, using the processing circuitry 210, if the head-mounted device 260 is correctly positioned on the user 270 may further comprise the sub-steps of obtaining a gaze angle β for the first eye 100 and comparing the obtained gaze angle β to a preset gaze angle threshold value $T_{GA}$. If the obtained gaze angle β is below the preset gaze angle threshold value $T_{GA}$, the method then continues with the steps 310 and 320 of performing eye tracking and determining if the head-mounted device 260 is correctly positioned on the user 270. If the obtained gaze angle β is not below the preset gaze angle threshold value $T_{GA}$, the method may continue by repeating the sub-steps of obtaining the gaze angle β for the first eye 100 and comparing the obtained gaze angle β to the preset gaze angle threshold value $T_{GA}$. Obtaining the gaze angle β may be performed separately for both the first and the second eye 100, 600 of the user 270.

Figure 6:
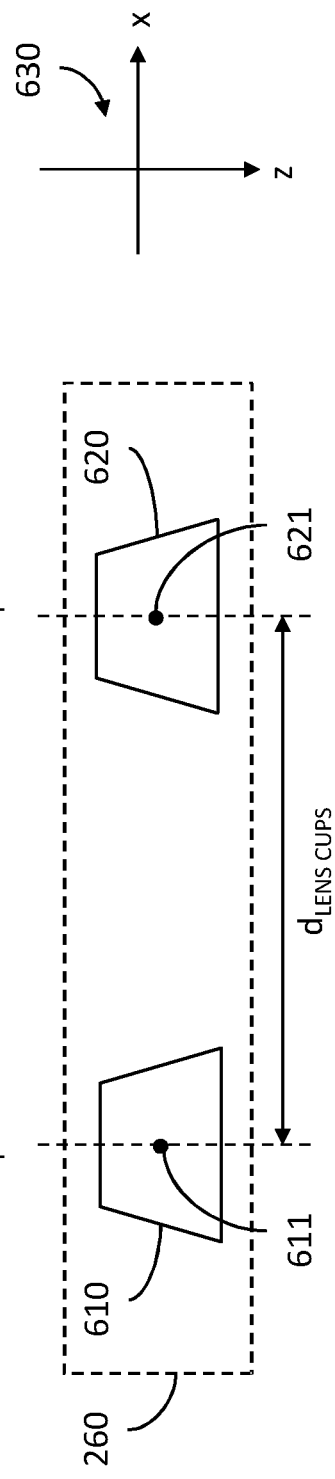
FIG. 6 shows a schematic view of a pair of eyes of a user of a head-mounted device, and the head-mounted device.
Figure 7B:
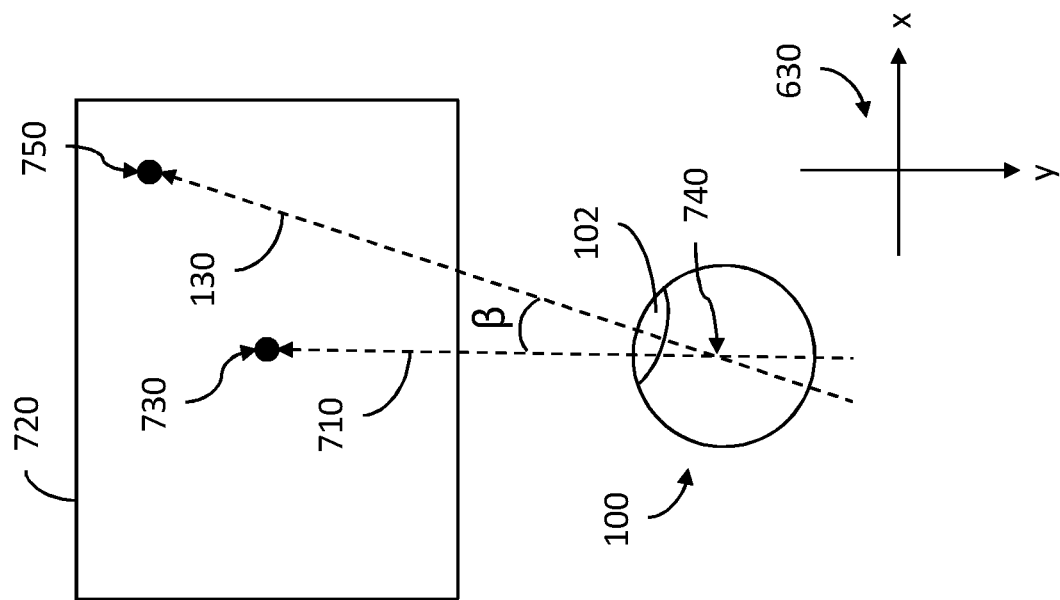
FIG. 7b shows a schematic view of an eye and an image onto which the gaze of the eye is directed.
Figure 7A:
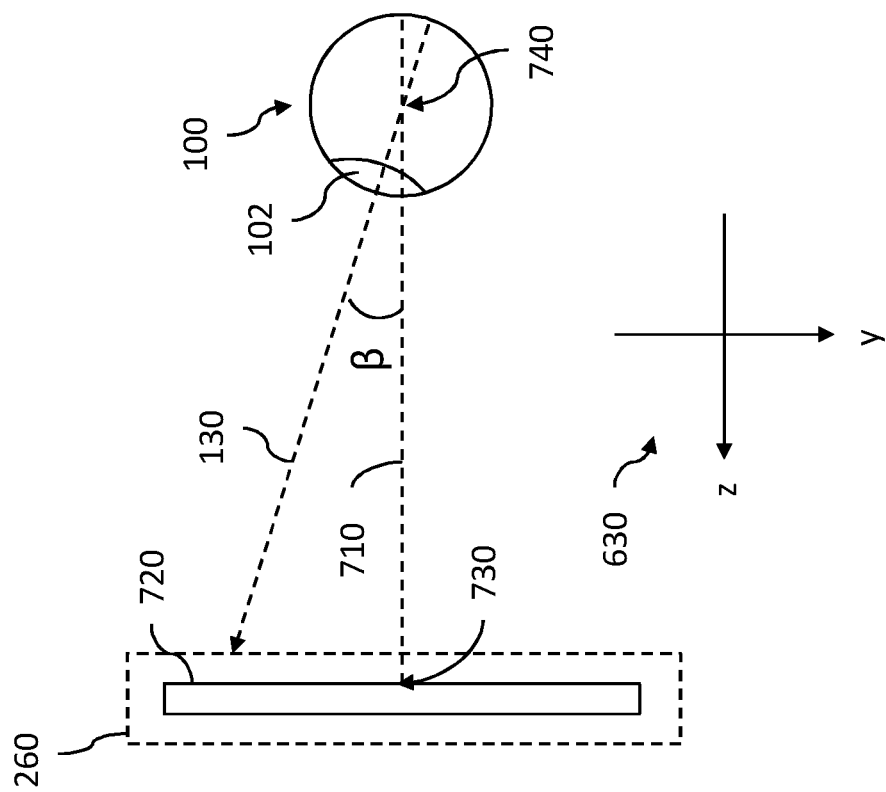
FIG. 7a shows a schematic view of an eye and a head-mounted device, according to one or more embodiments.

Now referring to FIG. 7a and FIG. 7b, the gaze angle β may be defined as the angle between an optical axis 710 of the head mounted device 260 and a gaze direction 130 of the first eye 100 of the user 270, wherein the optical axis 710 of the head mounted device 260 is defined as a vector passing through a focal point 740 of the first eye 100 and an origin of coordinates in an internal coordinate system 630 of the head mounted device 260, and wherein the gaze direction 130 of the first eye 100 of the user 270 is defined as a vector passing through the focal point 740 of the first eye 100 and a gaze point 750 of the first eye 100 at the display 720. The focal point 740 may also be referred to as gaze origin and typically refers to the center of the eye 100, the center of the eye ball of the eye 100, or the center of the cornea 101 of the eye 100. The internal coordinate system may for example be the coordinate system 630, illustrated from different views in FIGS. 6, 7a and 7b.

In other words, the method may comprise, once or iteratively, obtaining the gaze angle β of an eye of the user and comparing it to a preset threshold. If the gaze angle β is below the preset gaze angle threshold value $T_{GA}$, this means that the gaze of the user 270, or specifically the gaze of the first eye 100 of the user 270, is directed at the center 730 of an image displayed on the display 720 of the head-mounted device 260, or at a point in the image that is within a preset allowable tolerance from the center 730. If the gaze angle β is instead not below the preset gaze angle threshold value $T_{GA}$, the gaze of the user 270, or specifically the gaze of the first eye 100 of the user 270, is directed at a point too far from the center 730 of the image. If this is the case, for instance if the user 270 is looking at an upper right corner of the display 720 instead of gazing straight ahead, which may also referred to as gazing or looking in the forward direction, there is no need to perform steps 310 and 320, since the result will not be reliable if the user 270 is not gazing straight ahead in the direction of an optical axis 710 of the head mounted device 260, or at least close to this direction. The optical axis 710 of the head mounted device 260 may as illustrated in FIG. 7a extend along the z-axis of the internal coordinate system 630 of the head-mounted device 260, whereby the optical axis 710 always extends in the forward direction as seen from the user 270 gazing towards the display 720 of the head-mounted device 260. Therefore, checking the gaze angle β and comparing it to the preset gaze angle threshold value $T_{GA}$ may further improve the performance and reliability of one or more embodiments presented herein. In some embodiments, there may be defined an optical axis 710, and hence also the internal coordinate system 630, for each of the eyes of the user 270, wherein each optical axis 710 extends from one eye towards the display 720 arranged to be viewed by said eye. For example, first and second head-mounted displays may be arranged in, or in connection two, a first and second lens cups 610, 620, respectively, comprised in the head-mounted device 260. An example of such lens cups, 610, 620, comprised in a head-mounted device 260 is schematically illustrated in FIG. 6.

The method according to any embodiment described in connection with steps 310 and 320, optionally including one or more sub-steps, may be performed separately for both the first and second eyes 100, 600 of the user 270, and it may be concluded that the head-mounted device 260 is incorrectly positioned on the user 270 if this is true for at least one of the first and second eye.

In some embodiments, step 310 of performing eye tracking, using processing circuitry 210, may comprise the sub-steps shown in FIG. 3c. In these embodiments, the method comprises:

In step 312: obtaining an eye rotation center 105 for the first eye 100, wherein the eye rotation center 105 defines a point where all gaze directions of the first eye 100 converge behind the cornea 101 of the first eye 100.

Obtaining the eye rotation center 105 for the first eye 100 may in some embodiments mean retrieving or receiving a previously determined eye rotation center from the memory 240.

In other embodiments, obtaining the eye rotation center 105 for the first eye 100 may be understood as determining the eye rotation center 105, by the processing circuitry 210 of the system 200, by: estimating, for each image in a set of multiple images of the first eye 100 of the user 270, the position of the cornea 101, or the center of the cornea 101, and a gaze direction 130 for the first eye 100; and estimating the eye rotation center 105 as the point where all gaze directions 130 converge behind the cornea 101 of the first eye 100.

In one or more embodiments, estimating the position of the cornea 101, or the center of the cornea 101, determining the gaze direction 130 and estimating the eye rotation center 105 may be performed separately for both the first and the second eye 100, 600 of the user 270.

Determination of the eye rotation center 105 may be performed using any suitable eye tracking method known in the art, e.g. pupil-center-cornea reflection (PCCR), corner of eye to pupil, machine learning models, etc.

In step 313: for a given gaze direction 130, estimating the position of the pupil 102 of the first eye 100 in three dimensions, based on the obtained eye rotation center 105.

In step 314: estimating the position of the pupil 102 of the first eye 100 in two dimensions, based on the estimated position of the pupil 102 of the first eye 100 in three dimensions.

In one or more embodiments of the method of FIG. 3c, estimating the position of the pupil 102 of the first eye 100, in two dimensions of step 311, is based only on the estimated position of the pupil 102 of the first eye 100 in three dimensions. Alternatively, estimating the position of the pupil 102 of the first eye 100, in two dimensions of step 311, is further based on the estimated position of the pupil 102 of the first eye 100 in three dimensions. In other words, the method embodiments shown in FIG. 3b and FIG. 3c may be combined. In some embodiments, the method may comprise determining, based on an estimated radius of the eye rotation center 105, where the pupil 102 of the first eye 100 would be positioned if the gaze direction 130 is straight forward, or in other words aligned with the optical axis 710 of the head mounted device 260. Thus, we can, for any known gaze angle β, including what in this context is considered to be very large gaze angles β, adjust for pupil movement in the 2D image due to the gaze angle β. In other words, the method may comprise adjusting for pupil movement in a 2D image depicting the first eye 100 based on the eye rotation center 105 and an obtained gaze angle β. Further, since we can always estimate where the pupil 102 would be positioned if the gaze direction 130 is straight forward, or aligned with the optical axis 710 of the head mounted device 260, we can reduce the predetermined allowable area 120 for gaze direction estimates straight forward. In other words, the method may comprise reducing the predetermined allowable area 120 if the gaze direction 130 is aligned with, or within a preset allowable tolerance of, the optical axis 710 of the head mounted device 260.

The embodiments of method step 310 presented in connection with FIG. 3c may be combined with any or all of the embodiments of method step 320 presented herein.

In some embodiments, step 310 of performing eye tracking, using processing circuitry 210, and/or step 320 of determining if the head-mounted device 260 is correctly positioned on the user 270, using processing circuitry 210, may comprise the sub-steps shown in FIG. 3d. In these embodiments, the method comprises:

In step 315: perform eye tracking by estimating, based on a second image 510 of a second eye of the user 270, a position of a pupil 602 of the second eye in 2D.

Figure 5:
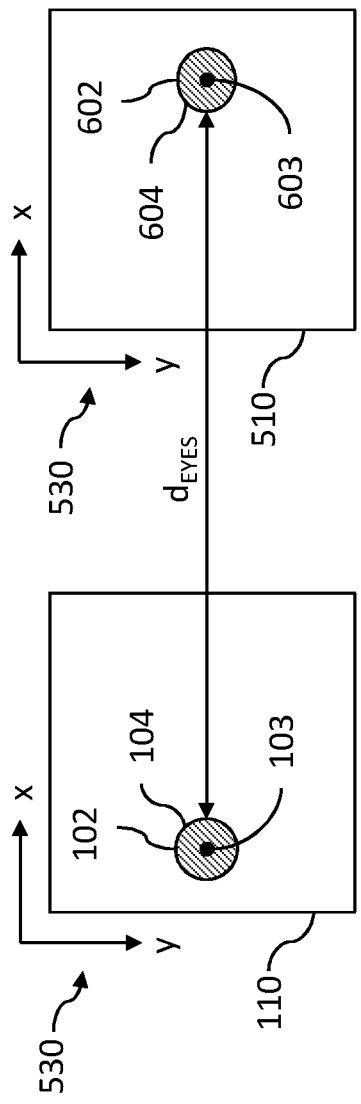
FIG. 5 shows a first image of the eye of FIG. 1a and a second image of a second eye.

An example of such a second image 510 is shown in FIG. 5, which shows, in a front view of at least a pupil 602 of the second eye, with a pupil center 603 and a pupil edge 604.

In one or more embodiments, each of the positions of the pupils 102, 602 of the first and second eye, respectively, are defined according to a common coordinate system. A non-limiting example of such a common coordinate system 530, in 2D, is illustrated in FIG. 5, defined in relation to the first and/or second image 110, 510 and/or the camera used for capturing the first and/or second image 110, 510. The position of the pupil 602 may be defined as a 2D coordinate according to the common coordinate system. Alternatively, the position of the pupil 602 may be defined as a group of two or more 2D coordinates comprised within the area of the pupil 602 as depicted in the second image 510.

In some embodiments, step 315 may comprise obtaining the second image 510, by receiving or retrieving the first image 110 from the memory 240 or camera (not shown in the figures) incorporated in or external to the system 200.

In some embodiments, the position of the pupils 102, 602 of the first and second eyes, respectively, may be approximated as the position of the center 103 of the first pupil 102, and the center 603 of the second pupil 602, respectively. In other embodiments, the position of the pupils 102, 602 of the first and second eyes, respectively, may be derived from one or more coordinates located on the pupil edge 104 of the first pupil 102 and the pupil edge 604 of the second pupil 602, respectively. In some embodiments, the position of the pupils 102, 602 of the first and second eyes 100, 600, respectively, may be approximated as the position of the center of the iris of the first pupil 102, and the center of the iris of the second pupil 602, respectively.

In step 316: determining an eye separation distance $d_{EYES}$ as the difference between the position of the pupil 102 of the first eye 100 and the position of the pupil 602 of the second eye.

In step 324: determining whether the absolute value of the determined eye separation distance $d_{EYES}$ is above a preset eye separation threshold value $T_{EYES}$.

If the absolute value of the determined eye separation distance $d_{EYES}$ is above the preset eye separation threshold value $T_{EYES}$, the method is continued in step 325.

If the absolute value of the determined eye separation distance $d_{EYES}$ is not above the preset eye separation threshold value $T_{EYES}$, the method is continued in step 326.

In some embodiments, the eye separation distance $d_{EYES}$ may be determined in one dimension, for example as the distance in the x direction of the example coordinate system 530. In other embodiments, the eye separation distance $d_{EYES}$ may be determined in two dimensions, for example as the distance in the x direction and the y direction of the example coordinate system 530.

In step 325: concluding that the head-mounted device 260 is incorrectly positioned on the user 270.

In other words, step 325 concluding that there is a difference between the distance between the eyes of the user 270 and the lens cups 610, 620 that exceeds the preset threshold value $T_{EYES}$, wherein $T_{EYES}$ defines the limit for when the difference is too big for the system 200 to provide an acceptable visual experience for the user 270. In yet other words, if $T_{EYES}$ is exceeded, the lens cup distance $d_{LENS\_CUP}$ needs to be adjusted, because the lens cups 610, 620 are not aligned with the user's eyes and FOV.

In step 326: concluding that the head-mounted device 260 is correctly positioned on the user 270.

The embodiments steps 315, 316 and 324 to 326 described in connection with FIG. 3d may be combined with any or all of the other embodiments of method steps 310 and/or 320 presented herein. Thereby, alternative and possibly further improved manners of determining if the head-mounted device 260 is correctly positioned on a user 270 may be obtained.

In some embodiments, step 310 of performing eye tracking, using processing circuitry 210, and/or step 320 of determining if the head-mounted device 260 is correctly positioned on the user 270, using processing circuitry 210, may comprise sub-steps shown in FIG. 3e. In these embodiments, the method comprises:

In step 317: estimating a lens cup separation distance $d_{LENS\_CUP}$ as the difference between the position of the center 611 of the first lens cup 610 of the head-mounted device 260 and the position of the center 621 of the second lens cup 620 of the head-mounted device 260, in 3D.

The position of the center 611 of the first lens cup 610 of the head-mounted device 260 and the position of the center 621 of the second lens cup 620 of the head-mounted device 260 may be obtained in in any suitable manner, for example by being received or retrieved from the memory 240 or other processing circuitry 210, or calculated during use of the head-mounted device 260.

In step 318: performing eye tracking by estimating an eye separation distance $d_{EYES}$ as the difference between the position of the pupil 102 of the first eye 100 of the user 270 and the position of the pupil 602 of the second eye 600 of the user 270, in 3D.

Each of the positions of the centers 611, 621 of the first and second lens cup 610, 620, respectively, and each of the pupils 102, 602 of the first and second eye 100, 600 of the user 270, respectively, may be defined according to a common coordinate system, for example the coordinate system 630.

Alternatively, instead of using the pupil position, step 318 may comprise using for instance pupil centers 103, 603, cornea centers, iris centers or eye ball centers of the first and second eyes, respectively, to estimate the eye separation.

It will be appreciated that steps 317 and 318 may be performed in any order, subsequently or in parallel.

In step 319: calculating the difference $d_{DIFF}$ between the lens cup separation distance $d_{LENS\_CUP}$ and the eye separation distance $d_{EYES}$.

In one or more embodiment, the difference $d_{DIFF}$ is defined and calculated in 3D.

In step 327: determining whether the calculated difference $d_{DIFF}$ between the lens cup separation distance $d_{LENS\_CUP}$ and the eye separation distance $d_{EYES}$ is above a preset difference threshold value $T_{DIFF}$.

If the absolute value of the determined eye separation distance $d_{EYES}$ is above the preset eye separation threshold value $T_{EYES}$, the method is continued in step 328.

If the absolute value of the determined eye separation distance $d_{EYES}$ is not above the preset eye separation threshold value $T_{EYES}$, the method is continued in step 329.

In step 328: concluding that the head-mounted device 260 is incorrectly positioned on the user 270.

In other words, step 328 comprises concluding that there is a difference between the distance between the eyes of the user 270 and the lens cups 610, 620 that exceeds the preset threshold value $T_{EYES}$, wherein $T_{EYES}$ defines the limit for when the difference is too big for the system 200 to provide an acceptable visual experience for the user 270. In yet other words, if $T_{EYES}$ is exceeded, the lens cup distance $d_{LENS\_CUP}$ needs to be adjusted, because the lens cups 610, 620 are not aligned with the user's eyes and FOV.

In step 329: concluding that the head-mounted device 260 is correctly positioned on the user 270.

The embodiments steps 315, 316 and 324 to 326 described in connection with FIG. 3d may be combined with any or all of the other embodiments of method steps 310 and/or 320 presented herein. Thereby, alternative and possibly further improved manners of determining if the head-mounted device 260 is correctly positioned on a user 270 may be obtained.

Further Embodiments

In one or more embodiment, there is provided a non-transitory computer-readable storage medium storing instructions which, when executed by processing circuitry 210 of the system 200, cause the system 200 to perform the method of any of the embodiments presented herein. The non-transitory computer-readable storage medium may store instructions which, when executed by processing circuitry 210 of the system 200, cause the system 200 to perform eye tracking, by: estimating, based on an image of the first eye 100 of the user, the position of the pupil 102 of the first eye 100; and determine if the head-mounted device 260 is correctly positioned on the user 270, by: determining whether the estimated position of the pupil 102 of the first eye 100 is within a predetermined allowable area 120 in the first image 110; and if the determined position of the pupil 102 of the first eye 100 is inside the predetermined allowable area 120 of the first image 110: concluding that the head-mounted device 260 is correctly positioned on the user, or if the determined position of the pupil 102 of the first eye 100 is outside the predetermined allowable area 120 of the first image 110: concluding that the head-mounted device 260 is incorrectly positioned on the user 270. In some embodiments, the non-transitory computer-readable storage medium may further storing instructions which, when executed by processing circuitry 210 of the system 200, cause the system 200 to perform a position correction procedure if the head-mounted device 260 is determined to be incorrectly positioned on the user 270.

The non-transitory computer-readable storage medium may in some embodiments store instructions which, when executed by processing circuitry 210 of the system 200, cause the system 200 to perform the method as defined in any of the method disclosed herein (in other words, in the claims, the summary, or the detailed description).

The non-transitory computer-readable storage medium may for example be provided in a computer program product. In other words, a computer program product may for example comprise a non-transitory computer-readable storage medium storing instructions which, when executed by the processing circuitry 210 of the system 200, cause the system 200 to perform the method as defined in any of the method embodiments As described above with reference to FIG. 2, the storage medium need not necessarily be comprised in the system 200.

The person skilled in the art realizes that the present invention is by no means limited to the preferred embodiments described above. On the contrary, many modifications and variations are possible within the scope of the appended claims. For example, the embodiments described above with reference to FIGS. 3a to 7b may, as explained herein, be combined to form further embodiments. Further, it will be appreciated that the system 200 shown in FIG. 2 is merely intended as an example, and that other systems may also perform the methods described above with reference to FIGS. 3a to 3e.

It will be appreciated that the processing circuitry 210 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A method for determining if a head-mounted device for extended reality (XR) is correctly positioned on a user, the method comprising:
performing eye tracking, using processing circuitry, by estimating, based on a first image of a first eye of the user, the position of the pupil of the first eye in two dimensions;
determining, using the processing circuitry, if the head-mounted device is correctly positioned on the user, by:
determining whether the estimated position of the pupil of the first eye is within a predetermined allowable area in the first image; and
(i) if the determined position of the pupil of the first eye is inside the predetermined allowable area of the first image: concluding that the head-mounted device is correctly positioned on the user, or
(ii) if the determined position of the pupil of the first eye is outside the predetermined allowable area of the first image: concluding that the head-mounted device is incorrectly positioned on the user
further comprising using the processing circuitry to:
perform eye tracking by estimating, based on a second image of a second eye of the user, the position of the pupil of the second eye in two dimensions, wherein each of the positions of the pupils of the first and second eyes, respectively, are defined according to a common coordinate system;
determining an eye separation distance ($d_{EYES}$) as the difference between the position of the pupil of the first eye and the position of the pupil of the second eye,
wherein determining, using the processing circuitry, if the head-mounted device is correctly positioned on the user, further comprises:
if the absolute value of the determined eye separation distance ($d_{EYES}$) is above a preset eye separation threshold value ($T_{EYES}$): concluding that the head-mounted device is incorrectly positioned on the user.

2. The method of claim 1, wherein the step of determining, using the processing circuitry, if the head-mounted device is correctly positioned on the user, further comprises:
a) obtaining a gaze angle ($\beta$) for the first eye;
b) comparing the obtained gaze angle ($\beta$) to a preset gaze angle threshold value ($T_{GA}$); and
if the obtained gaze angle ($\beta$) is below the preset gaze angle threshold value ($T_{GA}$), continuing with the steps of performing eye tracking and determining if the head-mounted device is correctly positioned on the user; or if the obtained gaze angle (β) is not below the preset gaze angle threshold value ($T_{GA}$), returning to step a).

3. The method of claim 2, wherein the obtained gaze angle (β) is defined as the angle between an optical axis of the head mounted device and a gaze direction of the first eye of the user, wherein the optical axis of the head mounted device is defined as a vector passing through a focal point of the first eye and an origin of coordinates in an internal coordinate system of the head mounted device, and wherein the gaze direction of the first eye of the user is defined as a vector passing through the focal point of the first eye and a gaze point of the first eye at the display.

4. The method of claim 1, wherein the step of performing eye tracking, using processing circuitry, further comprises:

obtaining an eye rotation center for the first eye wherein the eye rotation center defines a point where all gaze directions of the first eye converge behind the cornea of the first eye; and for a given gaze direction, estimating the position of the pupil of the first eye in three dimensions, based on the obtained eye rotation center, wherein estimating the position of the pupil of the first eye, in two dimensions is further based on the estimated position of the pupil of the first eye in three dimensions.

5. The method of claim 1, further comprising:

estimating a lens cup separation distance ($d_{LENS\_CUP}$) as the difference between the position of the center of a first lens cup of the head-mounted device and the position of the center of a second lens cup of the head-mounted device in three dimensions;

performing eye tracking by estimating the eye separation distance ($d_{EYES}$) as the difference between the position of the pupil of the first eye of the user and the position of the pupil of the second eye of the user, in three dimensions, wherein each of the positions of the centers of the first and second lens cups, respectively, and each of the pupils of the first and second eyes of the user, respectively, are defined according to the common coordinate system; and calculating a difference ($d_{DIFF}$) between the lens cup separation distance ($d_{LENS\_CUP}$) and the eye separation distance ($d_{EYES}$);

wherein determining, using the processing circuitry, if the head-mounted device is correctly positioned on the user, further comprises:

comparing the calculated difference ($d_{DIFF}$) between the lens cup separation distance ($d_{LENS\_CUP}$) and the eye separation distance ($d_{EYES}$) to a preset difference threshold value ($T_{DIFF}$); and if the calculated difference ($d_{DIFF}$) is above the preset difference threshold value ($T_{DIFF}$): concluding that the head-mounted device is incorrectly positioned on the user.

6. The method of claim 1, further comprising, if the head-mounted device is determined to be incorrectly positioned on the user: performing a position correction procedure.

7. The method of claim 6, wherein performing the position correction procedure comprises, if a lens cup separation distance ($d_{LENS\_CUP}$) has been determined to be too small or too large, performing motorized position correction of the lens cup separation distance ($d_{LENS\_CUP}$).

8. The method of claim 6, wherein performing the position correction procedure comprises notifying the system or the user about the determined incorrect position of the head-mounted device.

9. The method of claim 6, wherein performing the position correction procedure comprises initiating a positioning guide, which positioning guide provides guidance on steps to be taken for manual correction of the position of the head-mounted device.

10. A system for determining if a head-mounted device for extended reality (XR) is incorrectly positioned on a user, the system comprising processing circuitry configured to:

perform eye tracking by estimating, based on a first image of a first eye of the user, a position of a pupil of the first eye; and determine if the head-mounted device is correctly positioned on the user, by:

determining whether the estimated position of the pupil of the first eye is within a predetermined allowable area in the first image; and (i) if the determined position of the pupil of the first eye is inside the predetermined allowable area of the first image: concluding that the head-mounted device is correctly positioned on the user, or (ii) if the determined position of the pupil of the first eye is outside the predetermined allowable area of the first image: concluding that the head-mounted device is incorrectly positioned on the user;

wherein the processing circuitry is further configured to:

perform eye tracking by estimating, based on a second image of a second eye of the user, the position of the pupil of the second eye in two dimensions, wherein each of the positions of the pupils of the first and second eyes, respectively, are defined according to a common coordinate system;

determine an eye separation distance ($d_{EYES}$) as the difference between the position of the pupil of the first eye and the position of the pupil of the second eye, wherein the processing circuitry is configured to determine if the head-mounted device is correctly positioned on the user by:

if the absolute value of the determined eye separation distance ($d_{EYES}$) is above a preset eye separation threshold value ($T_{EYES}$): concluding that the head-mounted device is incorrectly positioned on the user.

11. The system of claim 10, wherein the processing circuitry is further configured to:

a) obtain a gaze angle (β) for the first eye;

b) compare the obtained gaze angle (β) to a preset gaze angle threshold value ($T_{GA}$); and if the obtained gaze angle (β) is below the preset gaze angle threshold value ($T_{GA}$), continue with the steps of performing eye tracking and determining if the head-mounted device is correctly positioned on the user; or if the obtained gaze angle (β) is not below the preset gaze angle threshold value ($T_{GA}$), return to step a).

12. The system of claim 10, wherein the processing circuitry is further configured to:

perform the eye tracking by obtaining an eye rotation center for the first eye, wherein the eye rotation center defines a point where all gaze directions of the first eye converge behind the cornea of the first eye; and for a given gaze direction, estimating the position of the pupil of the first eye in three dimensions, based on the obtained eye rotation center, wherein estimating the position of the pupil of the first eye in two dimensions, is further based on the estimated position of the pupil of the first eye in three dimensions.

13. The system of claim 10, wherein the processing circuitry is further configured to:
estimate a lens cup separation distance ($d_{LENS\_CUP}$) as the difference between the position of the center of a first lens cup of the head-mounted device and the position of the center of a second lens cup of the head-mounted device;
perform eye tracking by estimating the eye separation distance ($d_{EYES}$) as the difference between the position of the pupil of the first eye of the user and the position of the pupil of the second eye of the user, wherein each of the positions of the centers of the first and second lens cups, respectively, and each of the pupils of the first and second eyes of the user, respectively, are defined according to the common coordinate system;
calculate a difference ($d_{DIFF}$) between the lens cup separation distance ($d_{LENS\_CUP}$) and the eye separation distance ($d_{EYES}$); and
compare the calculated difference ($d_{DIFF}$) between the lens cup separation distance ($d_{LENS\_CUP}$) and the eye separation distance ($d_{EYES}$) to a preset difference threshold value ($T_{DIFF}$),
wherein the processing circuitry is further configured to determine if the head-mounted device is correctly positioned on the user by:
if the calculated difference ($d_{DIFF}$) is above the preset difference threshold value ($T_{DIFF}$): concluding that the head-mounted device is incorrectly positioned on the user.

14. The system of claim 10, wherein the processing circuitry is further configured to perform a position correction procedure if the head-mounted device is determined to be incorrectly positioned on the user.

15. The system of claim 14, wherein the processing circuitry is configured to, in the position correction procedure:
perform motorized position correction of a lens cup separation distance ($d_{LENS\_CUP}$), if the lens cup separation distance ($d_{LENS\_CUP}$) has been determined to be too small or too large;
notify the system or the user about the determined incorrect position of the head-mounted device; or
initiate a positioning guide, which positioning guide provides guidance on steps to be taken for manual correction of the position of the head-mounted device.

16. The system of claim 10 further comprising a head-mounted device.

17. A non-transitory computer-readable storage medium storing instructions which, when executed by processing circuitry of a system cause the system to:
perform eye tracking, by estimating, based on an image of a first eye of the user, the position of the pupil of the first eye; and
determine if the head-mounted device is correctly positioned on the user, by:
determining whether the estimated position of the pupil of the first eye is within a predetermined allowable area in the first image; and
(i) if the determined position of the pupil of the first eye is inside the predetermined allowable area of the first image: concluding that the head-mounted device is correctly positioned on the user, or
(ii) if the determined position of the pupil of the first eye is outside the predetermined allowable area of the first image: concluding that the head-mounted device is incorrectly positioned on the user
wherein the system is further caused to:
perform eye tracking by estimating, based on a second image of a second eye of the user, the position of the pupil of the second eye in two dimensions, wherein each of the positions of the pupils of the first and second eyes, respectively, are defined according to a common coordinate system;
determining an eye separation distance ($d_{EYES}$) as the difference between the position of the pupil of the first eye and the position of the pupil of the second eye,
wherein determining, using the processing circuitry, if the head-mounted device is correctly positioned on the user, further comprises:
if the absolute value of the determined eye separation distance ($d_{EYES}$) is above a preset eye separation threshold value ($T_{EYES}$): concluding that the head-mounted device is incorrectly positioned on the user.

18. The non-transitory computer-readable storage medium of claim 17, further storing instructions which, when executed by processing circuitry of a system, cause the system to perform a position correction procedure if the head-mounted device is determined to be incorrectly positioned on the user.

* * * * *